(No Model.) 2 Sheets—Sheet 2.

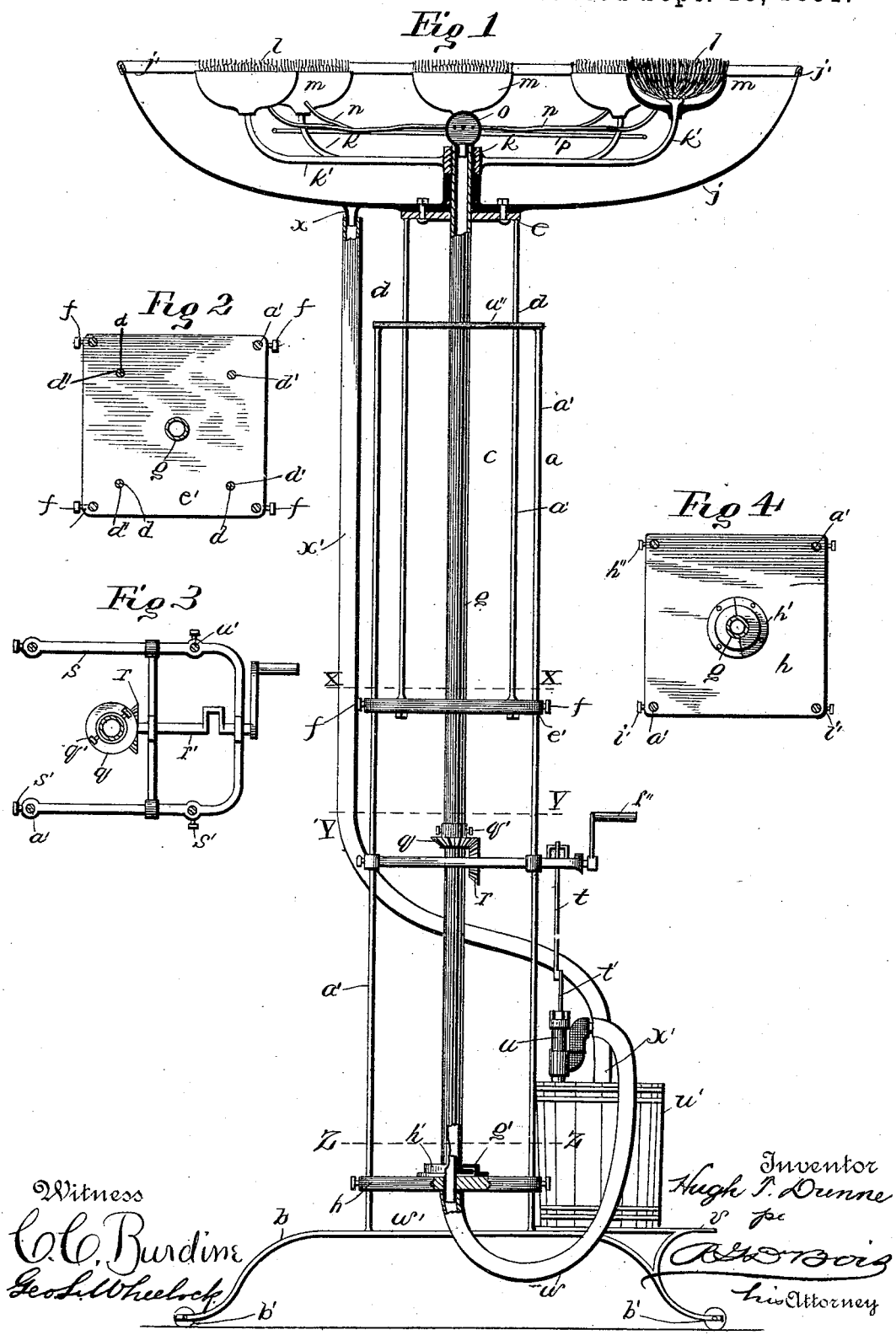

H. T. DUNNE.
MACHINE FOR CALCIMINING OR REMOVING CALCIMINE.

No. 459,486. Patented Sept. 15, 1891.

Witness
C. C. Burdine
Geo. L. Wheelock

Inventor
Hugh T. Dunne
per R. G. Orsing,
his Attorney

UNITED STATES PATENT OFFICE.

HUGH THOMAS DUNNE, OF NEW YORK, N. Y.

MACHINE FOR CALCIMINING OR REMOVING CALCIMINE.

SPECIFICATION forming part of Letters Patent No. 459,486, dated September 15, 1891.

Application filed January 21, 1891. Serial No. 378,548. (No model.)

*To all whom it may concern:*

Be it known that I, HUGH THOMAS DUNNE, a citizen of the United States, residing at New York, in the county of New York and State of New York, have invented certain new and useful Improvements in Machines for Calcimining or Removing Calcimine; and I do hereby declare the following to be a full, clear, and exact description of the invention, such as will enable others skilled in the art to which it appertains to make and use the same.

My invention relates to a machine for cleaning calcimine off of ceilings, and also for applying size and calcimine to ceilings; and to these ends my invention consists in scrubbing or brushing mechanism of peculiar construction, means for conveying calcimine or water to the brushes, and the peculiar combination and arrangement of parts, all of which will be hereinafter described, and then particularly pointed out in the claims.

Figure 5:
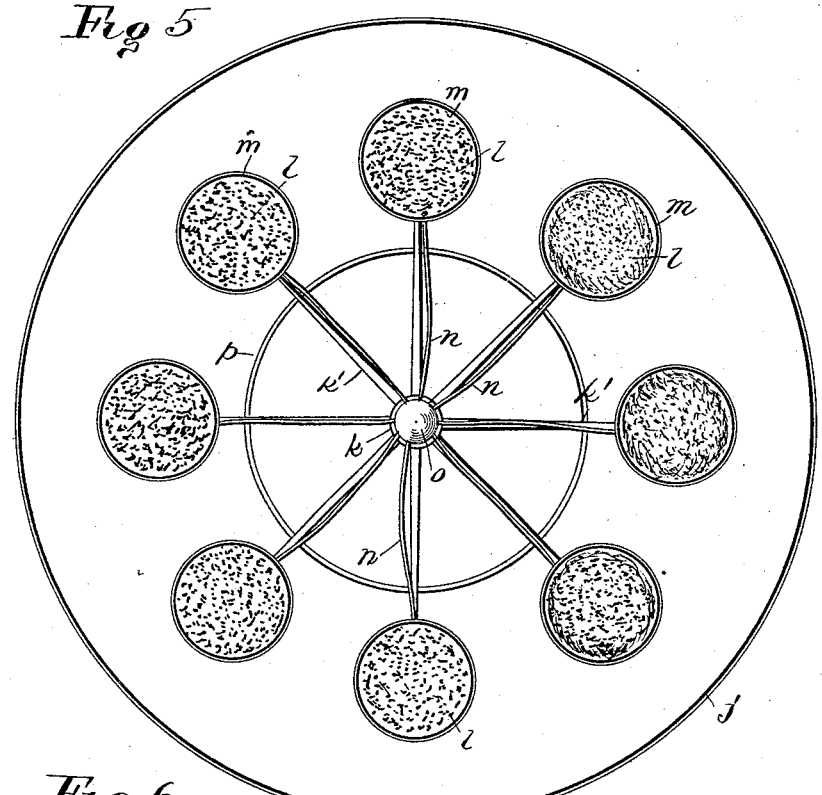
Figure 6:
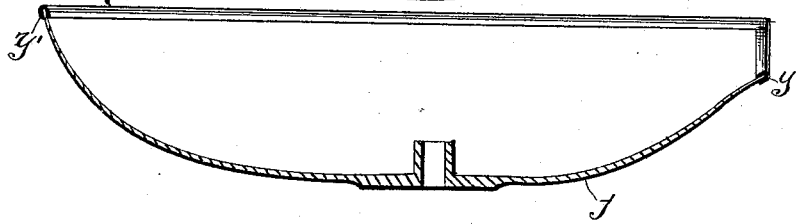
Figure 8:
Figure 7:
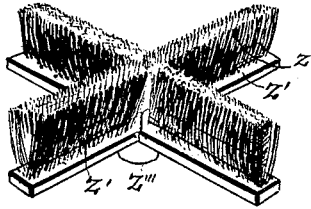
Figure 9:
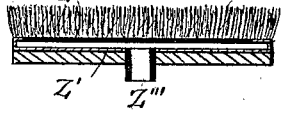

In the accompanying drawings, Figure 1 is an elevation showing my improvements. Fig. 2 is a section on line X X, Fig. 1. Fig. 3 is a section on line Y Y, Fig. 1. Fig. 4 is a section on line Z Z, Fig. 1. Fig. 5 is a view of the machine, looking from above. Fig. 6 is a modification of the drip-pan. Figs. 7, 8, and 9, are respectively a perspective and detail views of a modified form of applying-brush.

The supporting-frame $a$ is preferably constructed of iron, and is composed of rods $a'$ and a plate $a''$, and is provided with a base $b$, having rollers $b'$ for enabling the easy rolling of the machine upon the floor. Within the frame and capable of sliding through its top $a''$ is a vertically-adjustable frame $c$, which is composed of rods $d$ and upper and lower plates $e\ e'$, through which the rods pass. The adjustable frame $c$ is held to its adjusted position by means of set-screws $f$ entering the edge of the lower plate $e'$ and engaging the rods $d$, which pass through openings $d'$ in said plate. A revoluble pipe $g$ extends axially through the plates of frames $a$ and $c$ and has an annular flange $g'$ at its lower end, that turns upon the plate $h$ and within a divided boxing $h'$, that fits over the flange. The pipe may be raised or lowered on the plate $h$ and held in place by means of set-screws $h''$, that extend into the edge of the plate and engage the rods $a'$, which pass through openings $i$ in the plate.

Bolted to the upper plate $e$ of the vertically-adjustable frame $c$ is a drip-pan $j$ for catching the drippings, which is preferably of water-proof material, such as papier-maché. The edge of the drip-pan is tipped with a rubber covering $j'$. The shape of the pan is immaterial, provided it will catch the drippings and prevent splashing onto the walls and floor.

Screwed onto the pipe above the drip-pan is a sleeve $k$, projecting from which are arms $k'$, which are provided at their outer ends with brushes $l$. Said arms are flexible to support the brushes resiliently. These brushes are contained in and project somewhat above the cups $m$, supported by said arms, to which cups tubes $n$ lead, said tubes branching out from a central hardened-rubber bulb $o$, screwed into the upper end of the pipe $g$, and which communicates with the passage in the pipe. A ring $p$ connects and braces the arms $k'$. The pipe $g$ is turned by means of a bevel gear-wheel $q$, mounted adjustably thereon and held to its adjustment by means of a set-screw $q'$, with which bevel gear-wheel another bevel gear-wheel $r$ meshes. The latter is fixed on a crank-shaft $r'$, mounted in bearings provided by the bracket $s$, which is vertically adjustable on the frame by means of set-screws $s'$, which engage the rods $a'$ of the supporting-frame. The shaft $r'$ is provided with a handle $r''$ for turning it, and a pitman $t$ thereon is connected with a piston $t'$ of a suitable pump $u$, mounted on a bucket $u'$.

$v$ is a stand or bracket on the base $b$, on which the bucket may be fastened.

$w$ is a hose leading from the pump $u$ and connected with the lower end of a short tube $w'$, which projects above and below the plate $h$ and extends into the lower end of the pipe $g$, which latter revolves around it.

Secured to a nipple $x$, that extends down from the drip-pan $j$, is a spout $x'$, which leads to the bucket $u'$.

The operation of the machine is as follows: The adjustable frame being moved up so as to bring the drip-pan $j$ against the calcimined ceiling, and the bucket $u'$ being filled with water, the operator turns the handle $r''$, which causes the pump to force water up the pipe $g$ and through the tubes $n$ into the cups $m$, which hold the water up against the brushes. At the same time that the water is being pumped the brushes $l$ will revolve with the pipe $g$ and scrub the calcimine off of the ceiling. The drippings fall into the drip-pan below the brushes and escape through spout $x'$ into the bucket. When the water becomes dirty, clean water should of course be provided. If a sink is handy, the hose $w$ should be long enough so as to connect with the spigot, and the spout $x'$ can discharge directly into the sink.

In Fig. 6 I show a modification of the drip-pan, which is suitable for use when corners or moldings in the corners are to be cleaned. In this case the side $y$ is so formed as to fit against the wall, while the side $y'$ fits against the ceiling, the side $y$ being shorter than the side $y'$ to allow the brushes to normally project slightly beyond, so as to enter the crevices, and the side $y'$ being higher than side $y'$ so as to contact with the ceiling.

In Fig. 7 one of the applying-brushes $z$ is shown. It has a central core $z'''$, from which the tubes $z'$ within the bristles lead, said tubes being provided with slots $z''$, through which the calcimine oozes onto the bristles. As shown in said figure, the brush is smaller than in practice and is of cruciform shape; but any other suitable shape may be provided instead.

When it is desired to apply instead of remove calcimine, the arms $k'$, tubes $n$, cups $m$, and brushes $l$ are removed and brushes $z$ substituted. The operation of the machine will in this case be just the same as before, calcimine being substituted for water in the bucket. When calcimining the corners of rooms, the handle $r''$ is turned back and forth, so as to oscillate the brushes, thus effectually accomplishing the end sought.

Various slight changes may of course be made in my invention without departing from the spirit thereof, and such changes will readily suggest themselves to any skilled mechanic.

Having thus described my invention, the following is what I claim as new therein and desire to secure by Letters Patent:

1. In the herein-described machine, the combination of a suitable support, upwardly-extending brushes at the top of the support for contacting with and revoluble in a plane with the ceiling, revoluble mechanism for revolving said brushes, and means for conveying liquid matter to the brushes, substantially as and for the purposes set forth.

2. In the herein-described machine, the combination of a suitable support, brushes vertically adjustable thereon at the top of the support, revoluble mechanism for revolving said brushes, and a pipe for conveying liquid matter to the brushes, substantially as and for the purposes set forth.

3. In the herein-described machine, the combination of a suitable support, a vertically-adjustable frame mounted therein, a revoluble pipe within the support and frame, brushes located at the upper end of said pipe, means for revolving said pipe and the brushes carried thereby, and means for conveying liquid matter to said pipe, substantially as and for the purposes set forth.

4. In the herein-described machine, the combination of a suitable support, a revoluble pipe within the support, adjusting devices for raising and lowering the pipe, brushes carried at the upper end of the pipe, means for revolving the latter, and means for conveying liquid matter through the pipe to the brushes, substantially as and for the purposes set forth.

5. In the herein-described machine, the combination of a suitable support, a revoluble pipe within the support, adjusting devices for raising and lowering the pipe, arms projecting from the upper end of the pipe, brushes at the ends of the arms, means for revolving the pipe, and means for conveying liquid matter through the pipe to the brushes, substantially as and for the purposes set forth.

6. In the herein-described machine, the combination of a suitable support, a revoluble pipe within the support, arms projecting from the upper end of the pipe, a brace-ring connecting the outer ends of the arms, brushes carried by the arms, means for revolving the pipe, and means for conveying liquid matter through the pipe to the brushes, substantially as and for the purpose set forth.

7. In the herein-described machine, the combination of a suitable support, a vertically-adjustable revoluble pipe within the support, brushes carried at the upper end of the pipe, tubes leading from the pipe to the brushes, means for revolving the pipe and brushes, and means for conveying liquid matter through the pipe and tubes to the brushes, substantially as and for the purpose set forth.

8. In the herein-described machine, the combination of a suitable support, a vertically-adjustable revoluble pipe within the support, arms projecting from the upper end of the pipe, brushes carried by the arms, tubes leading from the pipe to the brushes, means for revolving the pipe and brushes, and means for conveying liquid matter through the pipe and tubes to the brushes, substantially as and for the purposes set forth.

9. In the herein-described machine, the combination of a support, a drip-pan, a spout leading therefrom, brushes above the drip-pan, means for revolving the brushes, and means for conveying liquid matter to the brushes, substantially as and for the purposes set forth.

10. In the herein-described machine, the combination of a support, a revoluble pipe within the support, brushes carried by the support, a drip-pan below the brushes, means for revolving the pipe and brushes, and means for conveying liquid matter to the brushes, substantially as and for the purpose set forth.

11. In the herein-described machine, the combination of a support, brushes, water-cups containing the brushes, means for revolving the brushes, and tubes for conveying water to the cups for the brushes, substantially as and for the purpose set forth.

12. In the herein-described machine, the combination of a support, a series of brushes, a series of water-cups, each cup containing one of the brushes, a drip-pan below the brushes and cups, means for revolving the brushes, and means for conveying water to the cups for the brushes, substantially as and for the purpose set forth.

In testimony whereof I affix my signature in presence of two witnesses.

HUGH THOMAS DUNNE.

Witnesses:
EDWARD FARRELL,
JAMES A. HAYES.